US009043877B2

(12) United States Patent
Auvenshine et al.

(10) Patent No.: US 9,043,877 B2
(45) Date of Patent: May 26, 2015

(54) TEMPORARILY PROVIDING HIGHER PRIVILEGES FOR COMPUTING SYSTEM TO USER IDENTIFIER

(75) Inventors: John J. Auvenshine, Tucson, AZ (US); Bernhard J. Klingenberg, Morgan Hill, CA (US); Neeta Garimella, San Jose, CA (US); Thomas K. Clark, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/574,562

(22) Filed: Oct. 6, 2009

(65) Prior Publication Data

US 2011/0083163 A1 Apr. 7, 2011

(51) Int. Cl.
G06F 12/14 (2006.01)
G06F 21/62 (2013.01)
G06F 21/57 (2013.01)

(52) U.S. Cl.
CPC ............ *G06F 21/6218* (2013.01); *G06F 21/57* (2013.01); *G06F 2221/2141* (2013.01); *G06F 2221/2145* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 6,775,781 B1 * | 8/2004 | Phillips et al. | 726/4 |
| 7,117,529 B1 * | 10/2006 | O'Donnell et al. | 726/6 |
| 7,210,144 B2 | 4/2007 | Traut | |
| 7,945,942 B2 * | 5/2011 | Perlman et al. | 726/2 |
| 2002/0169956 A1 * | 11/2002 | Robb et al. | 713/166 |
| 2006/0048131 A1 * | 3/2006 | Napier et al. | 717/168 |
| 2007/0005961 A1 | 1/2007 | Hamblin | |
| 2007/0006323 A1 | 1/2007 | Verbowski | |
| 2007/0168457 A1 * | 7/2007 | Huerta et al. | 709/217 |
| 2007/0179355 A1 * | 8/2007 | Rosen | 600/300 |
| 2007/0199068 A1 | 8/2007 | Russinovich | |

(Continued)

FOREIGN PATENT DOCUMENTS

CN 101359355 A 2/2009
CN 101444095 A 5/2009

(Continued)

OTHER PUBLICATIONS

Napier ("Secure Automation: Achieving Least Privilege with SSH, Sudo, and Suid Source System", Proceedings of Th e 18th Usenix Conference on System Administration. 2004 Lisa XVIII Nov. 14, 2004).*

(Continued)

*Primary Examiner* — Peter Poltorak
(74) *Attorney, Agent, or Firm* — Feb Cabrasawan

(57) ABSTRACT

A root user identifier of a computing system is disabled. Thereafter, and in response to determining that a problem with the computing system requires root privileges to the computing system to solve, a code patch for installation on the computing system is received from a third party. The code patch is installed on the computing system, resulting in a user identifier temporarily having the root privileges to the computing system. The user identifier is different than the root user identifier is. A password for the user identifier is provided to the third party to permit the third party to solve the problem with the computing system using the root privileges, via the user identifier temporarily having the root privileges to the computing system. The code patch is computer code installable on the computing system.

17 Claims, 3 Drawing Sheets

(56) References Cited

U.S. PATENT DOCUMENTS

| | | |
|---|---|---|
| 2007/0256068 A1 | 11/2007 | Barr |
| 2008/0022368 A1 | 1/2008 | Field |
| 2008/0040797 A1 | 2/2008 | Schwartz |
| 2008/0134314 A1 | 6/2008 | Hamid |
| 2008/0256606 A1 | 10/2008 | Koikara |
| 2008/0313417 A1 | 12/2008 | Kim |

FOREIGN PATENT DOCUMENTS

| | | |
|---|---|---|
| JP | 2006-27786 A | 8/2006 |
| JP | 2008-282298 A | 11/2008 |
| JP | 2009-541874 A | 11/2009 |

OTHER PUBLICATIONS

UnixTutorial ("Sudo tutorial", Jan. 2008 found on http://www.unixtutorial.org/2008/01/sudo-tutorial/).*

Linux ("The Newbie Gide to the 'root' account", May 2006, found at http://web.archive.org/web/20060504030424/http://www.linux-corner.info/sudo.html).*

MyDigitalLife ("Enable or Disable Built-in Administrator Account in Windows Vista", May 2007, http://www.mydigitallife.info/enable-or-disable-built-in-administrator-account-in-windows-vista).*

WindowsTipof theDay ("Disabling the Local Administrator Account", Dec. 2005, found at http://windowstipoftheday.blogspot.com/2005/12/disabling-local-administrator-account.html).*

Buecker et al., "Enterprise Security Architecture, Using IBM Tivoli Security Solitions", IBM Redbooks, ISBN-10, 0-7384-8641-8, Aug. 2007.*

Napier, "Secure Automation: Achieving Least Privilege with SSH, Sudo and Setuid," Proceedings of the 18th Large Installation System Administration, Nov. 2004, pp. 203-212.

Gligor, D. Virgil; "Review and Revocation of Access Privileges Distributed Through Capabilities", IEEE Transactions on Software Engineering, vol. SE-5, No. 6, Nov. 1979, pp. 575-586.

Song et al.; "A Qualitative Analysis of Privilege Escalation", 2006 IEEE International Conference on Information Reuse and Integration, Sep. 16-18, 2006, pp. 363-368.

Govindavajhala, et al., "Windows Access Control Demystified", Department of Computer Science, Princeton University, Jan. 31, 2006, online: <https://www.cs.princeton.edu/~appel/papers/winval.pdf>, 11 pp.

Qing et at; "A Dynamically Modified Privilege Control Policy", Proceedings of the 2006 IEEE Workshop on Information Assurance, Jun. 21-23, 2006, pp. 340-347.

Zhang et al.; "Mining Privilege Escalation Paths for Network Vulnerability Analysis", IEEE Fourth International Conference on Fuzzy Systems and Knowledge Discovery, Aug. 24-27, 2007, pp. 56-60.

* cited by examiner

TEMPORARILY PROVIDING HIGHER PRIVILEGES FOR COMPUTING SYSTEM TO USER IDENTIFIER

FIELD OF THE INVENTION

The present invention relates generally to accessing a computing system using higher privileges ordinarily associated with a first user identifier of the computing system, and more particularly to temporarily providing such higher privileges to a second user identifier of the computing system other than the first user identifier.

BACKGROUND OF THE INVENTION

Many entities, such as business organizations like corporations, rely on computing systems to store data important for the effective running of the entities, but which is also retained for review by outside parties, such as governmental organizations. For example, financial data of a corporation may have to be retained in such a way that historical information is not modified after the fact, so that a governmental organization like the Securities and Exchange Commission (SEC) can review the financial data at a later point in time if needed. Therefore, users of the corporation are prohibited from having access to their computing systems in such a way that they could potentially alter such historical data.

The user of an entity may be prohibited from having access to their computing systems in such a way that they could potentially alter such historical data for a variety of other reasons as well. Furthermore, the user of an entity may be prohibited from having access to their computing systems in various ways and/or for other reasons as well. Such other ways and/or other reasons include to prevent even read access to certain data, to prevent delaying transmission of certain data even if such data is not altered, and to prevent moving of certain data from one computer-readable storage medium to another, among other ways for among other reasons.

SUMMARY OF THE INVENTION

A method of an embodiment of the invention disables a first user identifier of a computing system, where the first user identifier has first privileges to the computing system. After disabling the first user identifier of the computing system, and in response to determining that a problem with the computing system requires the first privileges to the computing system to solve, the method performs the following. The method receives a code patch for installation on the computing system from a third party. The code patch is computer code installable on the computing system. The code patch is to temporarily provide at least a subset of the first privileges to a second user identifier of the computing system other than the first user identifier, where the second user identifier ordinarily has second privileges to the computing system lesser than the first privileges. The method installs the code patch on the computing system, resulting in the second user identifier temporarily having at least the subset of the first privileges to the computing system.

A computer program product of an embodiment of the invention includes a computer-readable storage medium having computer-readable program code embodied therein. The computer-readable program code includes computer-readable program code to disable a root user identifier of a computing system. The computer-readable program code further includes computer-readable program code to, in response to a determination being made that a problem with the computing system requires root privileges to the computing system to solve, install a code patch on the computing system. The code patch is computer code installable on the computing system. The code patch is to temporarily provide the root privileges to a predetermined user identifier of the computing system other than the root user identifier. The code patch is provided by a third party and is not able to be provided by an entity for which the computing system is provided. But for the code patch being installed on the computing system, a user knowing the password for the predetermined user identifier cannot have the root privileges to the computing system.

A computing system of an embodiment of the invention includes hardware, software to run on the hardware, and a security component. Access to the software is governed by a root user identifier having root privileges and by a predetermined user identifier not having root privileges. The predetermined user identifier is a different user identifier than the root user identifier is. The security component is to disable the root user identifier and thereafter, in response to a determination being made that a problem with the software requires the root privileges to solve, to install a code patch. The code patch is computer code installable on the computing system. The code patch is to temporarily provide the root privileges to the predetermined user identifier, and is provided by a third party and is not able to be provided by an entity for which the computing system is provided. But for the code patch being installed on the computing system, a user knowing the password for the predetermined user identifier cannot have the root privileges.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

Figure 1:
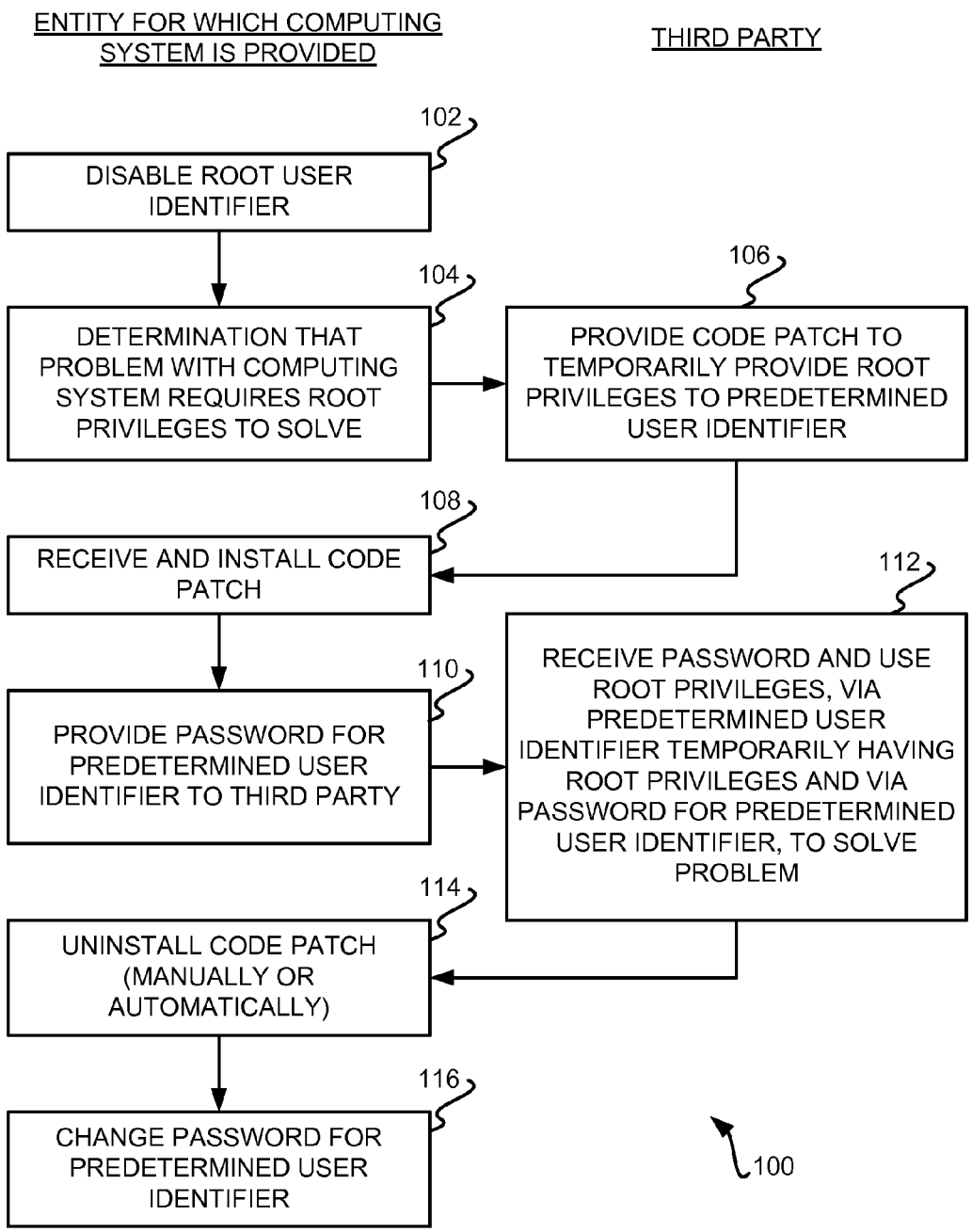
FIG. 1 is a flowchart of a method, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

As noted in the background, entities may have to retain data in such a way that the data cannot be modified after the fact, such that users of the entities are prohibited from having access to their computing systems in such a way that they could potentially alter this historical data. Normally, one or more users of an entity may be root users of the entity's computing system. A root user has complete and total access to a computing system, and is able to alter any data stored on the computing system. Therefore, if an entity's users are prohibited from having access to the computing system in such a way that they could potentially alter the data stored on the computing system, no users are permitted to always be root users. However, this is potentially problematic, because sometimes root privileges to a computing system are needed to solve problems with how the computing system is functioning.

Embodiments of the invention temporarily provide root privileges to a predetermined user identifier of a computing system so that such problems with the computing system can be solved, but in a way that minimizes the risk of the user associated with this predetermined user identifier having unfettered access to the system. The predetermined user identifier ordinarily does not have root privileges to the computing system, and the root user identifier to the system is permanently disabled. When a problem is identified with a computing system that requires such root privileges to solve, however, a third party provides a code patch that when installed on the system temporarily provides root privileges to the predetermined user identifier. The third party provides the code patch so that the user having the predetermined user identifier cannot alone provide him or herself with root privileges. The code patch is a portion of computer code—i.e., computer software—that is installed on the system for the express purpose of providing temporary root privileges to the predetermined user identifier. The user associated with this predetermined user identifier then provides his or her password to the third party so that the third party can solve the problem. Once the problem has been solved, the code patch is uninstalled from the computing system so that the user identifier no longer has root privileges, and the user changes the password, so that the third party no longer has knowledge of it.

Therefore, embodiments of the present invention ensure that a user having a predetermined user identifier cannot by him or herself increase the privileges associated with the identifier to root privileges. Rather, the code patch, which can be provided by only the third party, is required. Furthermore, the third party cannot provide itself with root-privileged access the computing system; without the password provided by the user, the third party does not have access to the computing system. Therefore, the acquiescence of both the user and the third party is needed to achieve root-privileged access to the computing system. Furthermore, such root-privileged access is short-lived: the code patch is automatically or manually uninstalled from the computing system once the problem with the system has been solved, which results in predetermined user identifier no longer having root privileges.

In this respect, it is noted that the inventive approach differs favorably from prior art solutions to this problem. One prior art approach does not permanently disable the root user identifier of a computing system, but rather escrows the password for the root user identifier. When root privileges are needed, the password for the root user identifier may be released only if a number of predetermined conditions have been satisfied, such as both a user at the entity and the third party authorizing such release. However, password escrow is problematic, because it requires the maintenance of a central repository for sensitive passwords, which is naturally a magnet to hackers and other nefarious individuals that desire access to an entity's computing systems.

Another prior art solution adds a number of software or hardware layers of security controls and logging features within an entity's computing system to ensure that the use of the root user identifier is employed only for authorized situations. However, such additional layers being added to the computing system adds complexity and overhead to the system. Performance of the computing system may be detrimentally affected as a result, and in the worst case problems may be introduced into the computing system by virtue of these additional layers. The inventive approach differs from both these prior art solutions in that the inventive approach does not escrow passwords, and does not add software or hardware layers of security controls and logging features to a computing system.

In the exemplary embodiments described below, a user identifier other than a root user identifier is temporarily provided with root privileges to a computing system, where the root user identifier has been disabled. However, more generally, a second user identifier other than a first user identifier is provided with at least a subset of first privileges to a computing system that are ordinarily accorded to the first user identifier, where the first user identifier has been disabled. The second user identifier ordinarily has second privileges to the computing system that are lesser than at least the subset of the first privileges of the first user identifier. As such, embodiments of the present invention more generally relate to temporarily providing a (second) user identifier of a computing system with higher (first) privileges (e.g., at least a subset of these higher, first privileges) ordinarily accorded to a different (first) user identifier that has been disabled.

FIG. 1 shows a method 100, according to an embodiment of the invention. The parts of the method 100 in the left-hand column are performed by or at a computing system that has been provided for an entity. For example, the entity may be a corporation or another type of business organization or other organization. The computing system is provided for the entity in that the entity may control the computing system, may have the computing system installed at the entity, and/or may include the primary users of the computing system to perform tasks for the effective running of the entity. The parts of the method 100 in the right-hand column are performed by or at a third party other than the entity. For example, the third party may be a support organization with which the entity has contracted to maintain the computing system, or the organization that manufactured or provided the computing system to or for the entity.

The root user identifier to the computing system is disabled (102). The root user identifier to the computing system permits complete and unfettered access to the computing system. A user having a root user identifier has all rights and permissions to all data stored and all computer programs run by the computing system. Such a user can do many things that other users not having the root user identifier cannot, such as changing the ownership of files, and binding to network ports numbered below 1024. The functionality that can be performed by a user having a root user identifier is referred to herein as root privileges.

The root user identifier is the name associated with such a "super user" in most UNIX® and UNIX®-like operating systems, including the LINUX® operating system. Other user identifiers that are equivalent to the root user identifier, and that are encompassed under this terminology herein, include the administrator user identifier in versions of the MICROSOFT® WINDOWS® operating system. Other user identifiers that are equivalent to the root user identifier, and that are encompassed under this terminology herein, also include the baron user identifier in versions of the BEOS® operating system, the avatar user identifier in some UNIX® operating systems, and the to or user identifier in the BSD® operating system, which is a version of the UNIX® operating system.

In one embodiment, the root user identifier to the computing system is disabled by setting the password for the root user identifier to a long string of unknown random characters. The characters may be randomly selected by machine, and are unknown in that they are not revealed to any user. The longer the string of the unknown random characters is, the more unlikely that that password may be hacked by nefarious users. For example, the password may be set to 63 or more unknown random characters, which is highly unlikely to be hacked within any reasonable length of time. It is noted, however, that the root user identifier can be disabled in other ways, besides setting its password to a long string of unknown random characters.

At some point, after the root user identifier has been disabled, a determination is made that there is a problem with the computing system that nevertheless requires root privileges to solve (104). It is noted that in some situations, it is contemplated that a significant length of time may pass between part 102 being performed and part 104 performed, such as months or even years. The root user identifier inherently has associated therewith root privileges, but as is described later in the detailed description, other user identifiers can temporarily be accorded root privileges so that users having such user identifiers have access to the computing system as if they had root user identifiers. It is noted that the inventors contemplate that most problems with the computing system, such as the software of the computing system not operating as intended, are likely to be solved without requiring root privileges to the computing system. Nevertheless, it cannot be guaranteed that all problems with the computing system can be solved without root privileges. However, such problems are anticipated to be rarely encountered.

In response to determining that there is a problem with the computing system that requires root privileges to solve, the third party is notified, and in response provides a code patch (106). The code patch temporarily provides root privileges to a predetermined user identifier. For example, a particular user of the entity for which the computing system has been provided may be responsible for working with the third party to solve the problem. Therefore, the code patch temporarily provides root privileges to the predetermined user identifier of this user, where this predetermined user identifier is different than the root user identifier. The code patch is received and installed at the computing system (108), which results in this predetermined user identifier having root privileges to the computing system.

In one embodiment, the predetermined user identifier is provided to the third party prior to the third party developing the code patch, so that the code patch is developed or written to temporarily provide root privileges specifically to the predetermined user identifier. As noted above, the code patch is a portion of computer code—i.e., computer software—that is installed on the computing system. Furthermore, the third party develops the code patch so that users of the entity itself cannot by themselves elevate their privileges. In another embodiment, the predetermined user identifier is not provided to the third party prior to the third party developing the code patch, so that the code patch is not developed or written to temporarily provide root privileges specifically to the predetermined user identifier. Rather, upon installation of the code patch at the computing system, the code patch may query a user for a user identifier to which root privileges are to temporarily be provided. In response, the user then enters the predetermined user identifier at that time.

The code patch includes one or more of the following in one embodiment of the invention. First, the code patch may have an identifier corresponding to the computing system at which it is to be installed. Therefore, during the process of installing the code patch on the computing system, the code patch is permitted to be installed only if this identifier matches the identifier of the computing system. The identifier may be a unique serial number of a particular computing device of the computing system, for instance.

Second, the code patch may have a digital signature that is known only to the third party. During the process of installing the code patch on the computing system, the code patch is also permitted to be installed only if this digital signature is verified as being valid. For example, the computing system may have access to a public key, and the third party may have access to a corresponding private key. If the private key with which the code patch has been signed by the third party matches the public key with which the computing system has been signed, only then is the code patch permitted to be installed on the computing system. Just the third party has access to the private key, and not the entity; for instance, users of the entity do not have access to the private key.

Third, the code patch may have a date, such as a beginning date and an ending date. During the process of installing the code patch on the computing system, the code patch is also permitted to be installed only if this date is verified as being valid. For example, the current date and time may have to fall between the beginning and ending dates added to the code patch for installation of the code patch to be permitted.

These security aspects of the code patch ensure that just the third party can provide such a code patch for installation on the computing system, such that other parties, like the entity and the users of the entity, cannot provide such a code patch. Because the code patch temporarily increases the privileges accorded to the predetermined user identifier to root privileges, the code patch, along with the password for this identifier, ultimately permits unfettered access to the computing system using the predetermined user identifier and its password. Therefore, the identifier, the digital signature, and the date ensure that just the third party can provide the code patch. For instance, only the third party, and not the entity, has knowledge of the digital signature with which to sign the code patch so that the patch is enabled to be installed on the computing system.

It is further noted that the code patch can have just one of these security aspects, just two of these security aspects, or all three of these security aspects to ensure that just the third party can provide a code patch for installation on the computing system. Other types of security aspects may also be implemented in relation to the code patch to ensure that just the third party can provide a code patch for installation on the entity. The other types of security aspects may be in addition to or in lieu of one or more of the security aspects of the code patch noted above.

The code patch includes computer-readable program code that when installed (i.e., executed) on the computing system, temporarily provides root privileges to the predetermined user identifier, such as by temporarily increasing privileges of the predetermined user identifier to privileges equivalent to the privileges of the root user identifier. In one embodiment, this computer-readable program code achieves this by executing a sudo computer program in relation to the predetermined user identifier, which is different than the root user identifier. The sudo computer program is a command-line program available in most UNIX® and UNIX®-like operating systems, including the LINUX® operating system, which allows programs to be run in accordance with user identifiers but with the privileges of other user identifiers, such as the root user identifier.

Once the code patch has been installed, the predetermined user identifier thus has root privileges to the computing system. Therefore, in one embodiment, the password for this predetermined user identifier is provided to the third party (110). The third party receives the password for the predetermined user identifier, and via this identifier temporarily having root privileges, and via the password provided, uses the root privileges to solve the problem that has been identified with the computing system (112). The third party is thus enabled to solve the problem without having to access the computing system via the root user identifier itself, which has been disabled, and without having to access the password for the predetermined user identified via a password escrow service, as in the prior art.

It is noted that but for the code patch being installed on the computing system, a user knowing the password for the predetermined user identifier—such as the user with which this identifier is associated—does not and cannot have root privileges to the computing system. This is because ordinarily the predetermined user identifier is not the root user identifier. Because such a user cannot develop and install the code patch without assistance from the third party, this means that the user is normally prevented from being able to have root privileges to the computing system.

Likewise, it is noted that but for the password for the predetermined user identifier being provided to the third party, the third party providing the code patch does not and cannot have root privileges to the computing system. This is because ordinarily the third party does not have the password for the predetermined user identifier. Because the third party does not ordinary have this password, this means that the third party is also normally prevented from being able to have root privileges to the computing system.

Once the third party has successfully solved the problem, the code patch is uninstalled (114), and the password for the predetermined user identifier is changed (116). Uninstalling the code patch results in the predetermined user identifier no longer having root privileges to the computing system, such that the user of the entity with which this identifier is associated no longer has unfettered access to the computing system. Furthermore, changing the password for the predetermined user identifier, by the user of the entity with which this identifier is associated, results in the third party no longer knowing the password for the predetermined user identifier. As such, the third party cannot later provide itself with root privileges to the computing system using this predetermined user identifier, without the knowledge of and assistance by the user with which the predetermined user identifier is associated.

The code patch may be uninstalled manually once the third party has successfully solved the problem with the computing system. For example, the third party may manually uninstall the code patch after solving the problem with the computing system, or a user of the entity, such as the user with which the predetermined user identifier is associated, may manually uninstall the code patch. Furthermore, the code patch may have an expiration time. After the expiration time has elapsed, the code patch is automatically uninstalled from the computing system, without interaction by any user of the entity or the third party. A best practice may be for manual uninstallation to be performed immediately after the problem with the computing system has been solved, but nevertheless to provide for an expiration time within the code patch so that if such manual uninstallation is not performed, the code patch is still ultimately uninstalled from the computing system.

In the embodiment of the invention that has been described above, after the code patch is installed on the computing system, the password for the predetermined user identifier is provided to the third party so that the third party can solve the problem with the computing system. In another embodiment, however, the third party is not provided with the password for the predetermined user identifier after the code patch has been installed on the computing system. In such an embodiment, the third party may, for instance, instead provide instructions to a user at the entity as to how to solve the problem, so that the problem can be solved without the third party being provided with the password for the predetermined user identifier.

Figure 2:
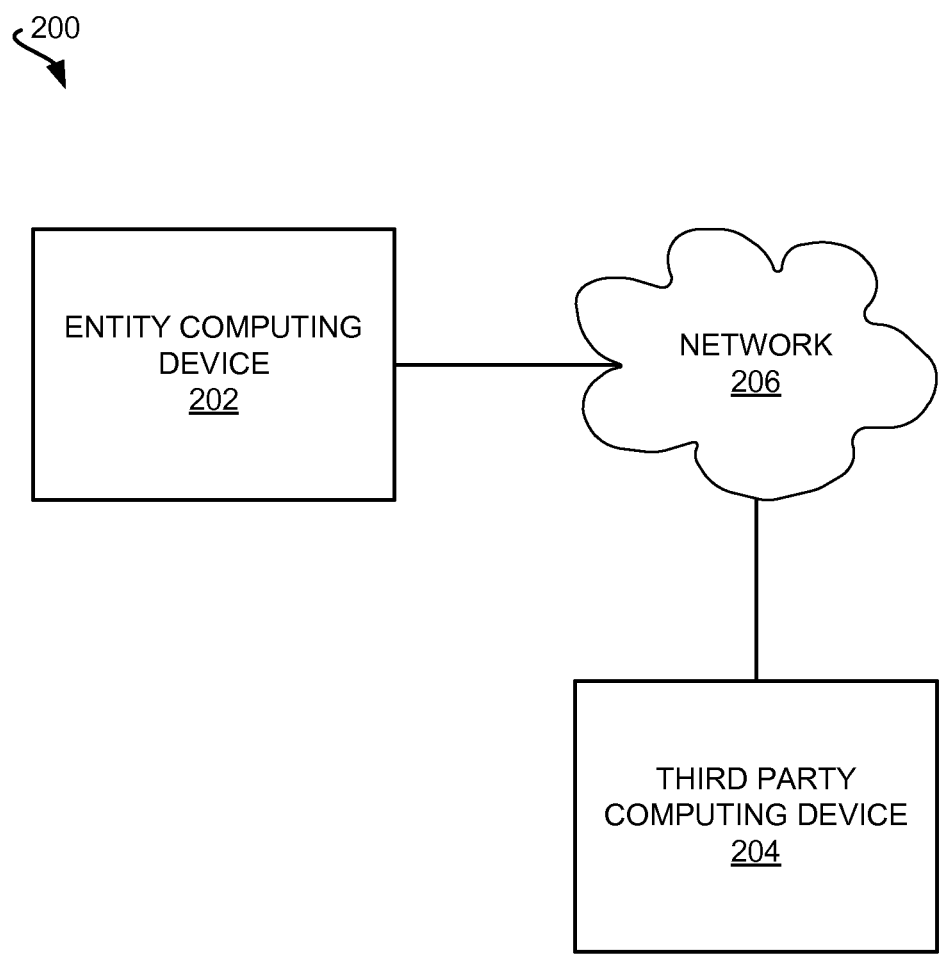
FIG. 2 is a diagram of a computing system, according to an embodiment of the present invention.

FIG. 2 shows a computing system 200, according to an embodiment of the invention. The computing system 200 includes a computing device 202 of or for the entity, which is referred to as the entity computing device 202. The computing system 200 further includes a computing device 204 of or for the third party, which is referred to as the third party computing device 204. The computing devices 202 and 204 are communicatively connected to one another via a network 206.

The entity computing device 202 is the computing device at which a problem has occurred that requires root privileges to solve. The code patch may be developed at the third party computing device 204. The code patch is transmitted from the third party computing device 204 to the entity computing device 202, and is installed at the entity computing device 202. The third party may access the entity computing device 202 over the network at the third party computing device 204, using the password provided by the entity for the predetermined user identifier that has root privileges resulting from installation of the code patch. Via such access to the entity computing device 202, the third party solves the problem with the computing device 202, after which time the code patch is uninstalled from the device 202 and the password for the predetermined user identifier changed.

Figure 3:
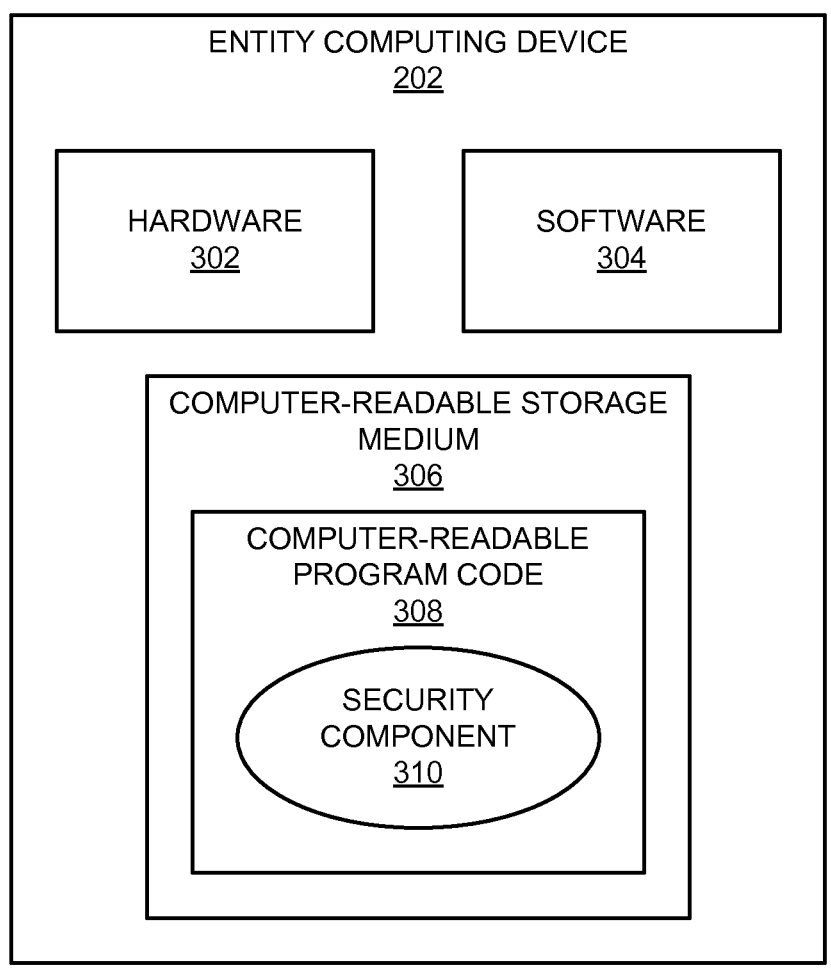
FIG. 3 is a diagram of a portion of the computing system of FIG. 2 in detail, according to an embodiment of the invention.

FIG. 3 shows the entity computing device 202 in more detail, according to an embodiment of the invention. The entity computing device 202 includes hardware 302 and software 304. The hardware 302 may include one or more processors, volatile memory, non-volatile storage devices, and other types of hardware. The software 304 may include one or more operating systems, one or more application computer programs, and other types of software. The software 304 is executed by and is run on the hardware 302. Access to the software 304 is governed by the root user identifier having root privileges, and by at least one predetermined user identifier not ordinarily having root privileges. The predetermined user identifier is different than the root user identifier.

The entity computing device 202 also includes a computer-readable storage medium 306, which may be part of the hardware 302. The computer-readable storage medium 306 stores computer-readable program code 308, which may be part of the software 304. The computer-readable program code 308 implements a security component 310. The security component 310 disables the root user identifier. Thereafter, in response to a determination being made that a problem with the software 304 requires root privileges to solve, the security component 310 installs a code patch.

As has been described, the code patch temporarily provides root privileges to the predetermined user identifier. The code patch is provided by a third party and is not able to be provided by the entity in question. But for the code patch being installed, a user knowing the password for the predetermined user identifier does not and cannot have root privileges. The third party accesses the software 304 to solve the problem after having been provided with the password for the predetermined user identifier so that the third party has root privileges by virtue of the code patch and this password. But for being provided this password, the third party providing the code patch does not and cannot have root privileges. Other aspects of the code patch that have been described in relation to the method of FIG. 1 are also amenable to implementation in relation to the system of FIG. 2 and the computing device of FIG. 3.

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented on computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented on special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   permanently disabling a root identifier of a computing system to secure data stored on the computing system;
   disabling a first identifier of the computing system, the first identifier having first privileges to the computing system, the first identifier being other than the root identifier of the computing system, the first identifier associated with an accountholder of the computing system, the accountholder alone being unable to provide the first privileges upon the first privileges being disabled;
   after disabling the first identifier of the computing system, and in response to determining that a problem with the computing system requires the first privileges to the computing system to solve,
      receiving a code patch for installation on the computing system from a third party unaffiliated with the accountholder, the code patch to temporarily provide at least a subset of the first privileges to a second identifier of the computing system other than the first identifier, the subset of the first privileges sufficient to solve the problem, the code patch being computer code installable on the computing system;
      installing the code patch on the computing system, resulting in the second identifier temporarily having at least the subset of the first privileges to the computing system;
      providing a password for the second identifier known to the accountholder to the third party to permit the third party to solve the problem with the computing system using at least the subset of the first privileges to the computing system via the second identifier temporarily having at least the subset of the first privileges to the computing system, the third party alone being unable to provide itself the second privileges without the password,
   wherein the code patch is only able to be provided by the third party, and the third party cannot provide itself with the subset of the first privileges in that without the password being provided by the user, the third party has no access to the computing system, such that acquiescence of both the user and the third party is needed to achieve the subset of the first privileges to the computing system.

2. The method of claim 1, further comprising, after the third party has solved the problem with the computing system using at least the subset of the first privileges to the computing system via the second identifier temporarily having first root privileges to the computing system,
   uninstalling the code patch from the computing system, resulting in the second identifier no longer having at least the subset of the first privileges to the computing system; and,
   changing the password for the second identifier so that the third party no longer knows the password for the second identifier.

3. The method of claim 1, wherein the code patch has an expiration time, such that, after the expiration time of the code patch has elapsed, the code patch is automatically uninstalled from the computing system, resulting in the second identifier no longer having at least the subset of the first privileges to the computing system.

4. The method of claim 1, wherein disabling the first identifier of the computing system comprises setting a password for the first identifier to a plurality of unknown random characters.

5. The method of claim 1, wherein installing the code patch on the computing system comprises one or more of:

the computing system comparing an identifier of the code patch against an identifier of the computing system, such that the code patch is installed on the computing system only if the identifier of the code patch matches the identifier of the computing system;

the computing system verifying a digital signature of the code patch, such that the code patch is installed on the computing system only if the digital signature of the code patch is valid; and, the computing system verifying a date of the code patch, such that the code patch is installed on the computing system only if the date of the code patch is valid.

6. The method of claim 5, wherein only the third party, and not an entity for which the computing system is provided, has knowledge of the digital signature with which to sign the code patch so that the code patch is enabled to be installed on the computing system.

7. The method of claim 1, wherein the code patch temporarily provides at least the subset of the first privileges to the second identifier of the computing system by temporarily increasing privileges of the second identifier to privileges equivalent to at least the subset of the first privileges of the first identifier via execution of a sudo computer program.

8. The method of claim 1, wherein the third party is enabled to solve the problem with the computing system without accessing the computing system via the first identifier.

9. The method of claim 1, wherein the third party is enabled to solve the problem with the computing system without having to access the password for the second identifier via a password escrow service.

10. The method of claim 1, wherein but for being provided the password for the second identifier, the third party providing the code patch installed on the computing system cannot have at least the subset of the first privileges to the computing system.

11. A computer program product comprising:
a storage device having computer-readable program code embodied therein, the computer-readable program code comprising:
computer-readable program code to permanently disable a root identifier of a computing system to secure data stored on the computing system; and,
computer-readable program code to, in response to a determination being made that a problem with the computing system requires root privileges to the computing system to solve, install a code patch on the computing system, the code patch to temporarily provide the root privileges to an identifier of the computing system other than the root identifier, the code patch provided by a third party and is not able to be provided by an entity for which the computing system is provided, the third party unaffiliated with the entity, the code patch being computer code installable on the computing system,
wherein but for the code patch being installed on the computing system, an accountholder knowing the password for the identifier cannot have the root privileges to the computing system,
and wherein the code patch is only able to be provided by the third party, and the third party cannot provide itself with the root privileges in that without the password being provided by the accountholder, the third party has no access to the computing system, such that acquiescence of both the accountholder and the third party is needed to achieve the root privileges to the computing system.

12. The computer program product of claim 11, wherein code patch has an expiration time, such that after the expiration time has elapsed, the code patch is automatically uninstalled from the computing system, resulting in the identifier no longer having the root privileges to the computing system.

13. The computer program product of claim 11, wherein the computer program code to disable the root identifier of the computing system disables the root identifier by setting a password for the root identifier to a plurality of unknown random characters.

14. The computer program product of claim 11, wherein the computer program code to install the code patch on the computing system installs the code patch on the computing system only if:
an identifier of the code patch matches an identifier of the computing system;
a digital signature of the code patch is valid; and,
a date of the code patch is valid,
wherein only the third party, and not the entity for which the computing system is provided, has knowledge of the digital signature with which to sign the code patch so that the code patch is enabled to be installed on the computing system.

15. A computing system comprising:
hardware;
software to run on the hardware, where access to the software is governed by a root identifier having root privileges and by an identifier not ordinarily having the root privileges, the identifier being a different identifier than the root identifier; and,
a security component to permanently disable the root identifier to secure data stored on the computing system and thereafter, in response to a determination being made that a problem with the software requires the root privileges to solve, to install a code patch, the code patch being computer code installable on the computing system,
wherein the code patch is to temporarily provide the root privileges to the identifier, the code patch provided by a third party and is not able to be provided by an entity for which the computing system is provided, the third party unaffiliated with the entity,
wherein but for the code patch being installed on the computing system, an accountholder knowing the password for the identifier cannot have the root privileges,
and wherein the code patch is only able to be provided by the third party, and the third party cannot provide itself with the root privileges in that without the password being provided by the accountholder, the third party has no access to the computing system, such that acquiescence of both the accountholder and the third party is needed to achieve the root privileges to the computing system.

16. The computing system of claim 15, wherein code patch has an expiration time, such that after the expiration time has elapsed, the code patch is automatically uninstalled, resulting in the identifier no longer having the root privileges.

17. The computing system of claim 15, wherein the security component is to install the code patch installs the code patch only if:
an identifier of the code patch matches an identifier of the computing system;
a digital signature of the code patch is valid; and,
a date of the code patch is valid,
wherein only the third party, and not the entity for which the computing system is provided, has knowledge of the digital signature with which to sign the code patch so that the code patch is enabled to be installed on the computing system.

* * * * *